US010579685B2

(12) United States Patent
Hill et al.

(10) Patent No.: US 10,579,685 B2
(45) Date of Patent: Mar. 3, 2020

(54) CONTENT EVENT INSIGHTS

(71) Applicant: Microsoft Technology Licensing, LLC, Redmond, WA (US)

(72) Inventors: Shawndra Benita Hill, New York, NY (US); Michael Barto, Bothell, WA (US); David Gordon Burtch, Minneapolis, MN (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 359 days.

(21) Appl. No.: 15/445,259

(22) Filed: Feb. 28, 2017

(65) Prior Publication Data

US 2018/0246967 A1    Aug. 30, 2018

(51) Int. Cl.
*G06F 16/00* (2019.01)
*G06F 16/951* (2019.01)
*G06F 16/29* (2019.01)

(52) U.S. Cl.
CPC ............ *G06F 16/951* (2019.01); *G06F 16/29* (2019.01)

(58) Field of Classification Search
CPC ........ G06F 16/951; G06F 16/29; G06F 16/24; G06F 16/33; G06F 16/835
See application file for complete search history.

(56) References Cited

U.S. PATENT DOCUMENTS 7,890,526 B1 * 2/2011 Brewer ............... G06F 16/3322
707/767
7,921,069 B2 * 4/2011 Canny ................ G06Q 30/02
706/47
8,051,444 B2    11/2011 Shkedi
8,484,676 B1    7/2013 Narsimhan et al.
8,972,391 B1 * 3/2015 McDonnell ............ H04L 67/10
707/727
8,997,144 B2   3/2015 Small et al.
9,282,346 B2   3/2016 Sinha et al.
(Continued)

OTHER PUBLICATIONS

Briggs, Louise, "The programmatic reality of syncing TV and online ads", http://programmaticadvertising.org/2015/05/14/the-programmatic-reality-of-syncing-tv-and-online-ads/, Published on: May 14, 2015, 7 pages.
(Continued)

*Primary Examiner* — Noosha Arjomandi
(74) *Attorney, Agent, or Firm* — Drinker Biddle & Reath LLP

(57) ABSTRACT

Analysis of the effects of content events on correlated search queries is provided herein. As content events occur, terminology and key words related to the content event are analyzed against search queries submitted to search engines to determine the effect of the content event on what persons exposed to the content event search for. The timing, devices used, a user-demographics of the searches are collected to refine the analysis of the effect of the content event. For example, search queries may be gathered into fine-grained time periods, mobile/desktop device groups, and various geographic regions to determine how users are performing searches in light of the content event. The gathered search queries are refined based on the searches of persons not exposed to the content event to more accurately demonstrate the effect of the content event.

19 Claims, 10 Drawing Sheets

(56) References Cited

U.S. PATENT DOCUMENTS

| | | | |
|---|---|---|---|
| 9,369,779 B2 | 6/2016 | Shkedi | |
| 9,418,337 B1* | 8/2016 | Elser | G06F 16/2468 |
| 9,529,922 B1* | 12/2016 | Wahi | G06F 16/90344 |
| 10,073,883 B1* | 9/2018 | Wong | G06F 16/2453 |
| 2005/0234761 A1* | 10/2005 | Pinto | G06F 17/50 |
| | | | 705/7.28 |
| 2007/0033531 A1* | 2/2007 | Marsh | G06Q 30/02 |
| | | | 715/738 |
| 2009/0172728 A1 | 7/2009 | Shkedi et al. | |
| 2012/0096491 A1 | 4/2012 | Shkedi | |
| 2012/0116869 A1 | 5/2012 | Vasudevan et al. | |
| 2013/0024440 A1* | 1/2013 | Dimassimo | G06F 16/338 |
| | | | 707/709 |
| 2013/0053005 A1* | 2/2013 | Ramer | H04W 4/025 |
| | | | 455/414.1 |
| 2013/0124263 A1* | 5/2013 | Amaro | G06Q 30/02 |
| | | | 705/7.34 |
| 2014/0164352 A1* | 6/2014 | Denninghoff | H03H 9/02622 |
| | | | 707/711 |
| 2014/0222549 A1 | 8/2014 | Bruich et al. | |
| 2014/0289213 A1* | 9/2014 | Delano | G06F 16/338 |
| | | | 707/706 |
| 2015/0006570 A1* | 1/2015 | Masuko | G06F 16/951 |
| | | | 707/769 |
| 2015/0046452 A1* | 2/2015 | Agrawal | G06F 16/9537 |
| | | | 707/737 |
| 2015/0073924 A1 | 3/2015 | Wickramasuriya et al. | |
| 2015/0120766 A1* | 4/2015 | Hamilton | G06F 16/335 |
| | | | 707/754 |
| 2015/0128163 A1 | 5/2015 | Cormican et al. | |
| 2015/0205825 A1* | 7/2015 | Sengupta | G06F 16/22 |
| | | | 707/758 |
| 2015/0206055 A1* | 7/2015 | Sengupta | G06F 16/00 |
| | | | 706/11 |
| 2015/0220577 A1* | 8/2015 | Sengupta | G06F 16/22 |
| | | | 707/758 |
| 2016/0165320 A1 | 6/2016 | Shkedi et al. | |
| 2017/0024388 A1* | 1/2017 | Bentley | G06F 16/9537 |
| 2018/0165599 A1* | 6/2018 | Pete | G06N 20/00 |

OTHER PUBLICATIONS

"Digital video and the connected consumer", https://www.accenture.com/us-en/insight-digital-video-connected-consumerhttps://www.accenture.com/us-en/insight-digital-video-connect%20ed-consumer, Retrieved on: Nov. 17, 2016, 12 pages.

Agarwal et al., "The impact of competing ads on click performance in sponsored search", In Information Systems Research, Forthcoming, Feb. 24, 2016, pp. 1-57.

Angrist et al., "Mostly Harmless Econometrics: An Empiricists Companion", In Publication of Princeton University Press, Jan. 23, 2009, 9 pages.

Henry Assael, "From silos to synergy: A fifty-year review of cross-media research shows synergy has yet to achieve its full potential", In Journal of Advertising Research, vol. 51, Mar. 1, 2011, pp. 1-17.

Autor, David H., "Outsourcing at will: The contribution of unjust dismissal doctrine to the growth of employment outsourcing", In Journal of Labor Economics, vol. 21, Issue 1, Jan. 1, 2003, pp. 1-42.
Black, Sandra E., "Do better schools matter? parental valuation of elementary education", In Quarterly journal of economics, vol. 114, Issue 2, May, 1999, pp. 577-599.

Broder, Andrei, "A taxonomy of web search", In ACM SIGIR Forum, vol. 36, Issue 2, Sep. 1, 2002, pp. 3-10.

Card et al., "Minimum wages and employment: A case study of the fast-food industry in new jersey and Pennsylvania", In the American Economic Review, vol. 84, Issue 4, Sep. 1994, pp. 772-793.

Fang et al., "An examination of different explanations for the mere exposure effect", In Journal of Consumer Research, vol. 34, Issue 1, Jun. 2007, pp. 97-103.

Forman et al., "Competition between Local and Electronic Markets: How the benefit of buying online depends on where you live", In Journal of Management Science, vol. 55, Issue 1, Jan. 2009, pp. 47-57.

Ghose et al., "How is the mobile internet different? search costs and local activities", In Journal of Information Systems Research, vol. 24, Issue 3, Sep. 2013, pp. 1-19.

Ghose et al., "An empirical analysis of search engine advertising: Sponsored search in electronic markets", In Journal of Management Science, vol. 55, Issue 10, Oct. 2009, pp. 1605-1622.

Joo et al., "Television advertising and online search", In Journal of Management Science, vol. 60, Issue 1, Jan. 2014, 2 pages.

Kitts et al., "Can television advertising impact be measured on the web? web spike response as a possible conversion tracking system for television", In Proceedings of the Eighth International Workshop on Data Mining for Online Advertising, Aug. 24, 2014, pp. 1-9.

Lambert et al., "Online effects of offline ads", In Proceedings of the Second International Workshop on Data Mining and Audience Intelligence for Advertising, Aug. 24, 2008, pp. 10-17.

Lewis et al., "Down-to-the-minute effects of super bowl advertising on online search behavior", In Proceedings of the fourteenth ACM conference on Electronic commerce, Jun. 16, 2013, pp. 639-656.

Lewis et al., "Online ads and offline sales: Measuring the effect of retail advertising via a controlled experiment on yahoo! Quantitative Marketing and Economics", In Journal of Quantitative Marketing and Economics, vol. 12, issue 3, Sep. 1, 2014, pp. 1-50.

"The Total Audience Report: Q4 2015", http://www.nielsen.com/us/en/insights/reports/2016/the-total-audience-report-q4/2015.html, Published on: Mar. 24, 2016, 4 pages.

Shapiro, Bradley T., "Positive Spillovers and Free Riding in Advertising of Prescription Pharmaceuticals: The Case of Antidepressants", in Working Paper of SSRN 2477877, Nov. 10, 2015, pp. 1-50.

Taylor, Paul W., "Third service, third network: The canwest global system", In Canadian Journal of Communication, vol. 18, Issue 4, 1993, 9 pages.

Tuchman, Anna E., "Advertising and Demand for Addictive Goods: The Effects of E-Cigarette Advertising", In Job Market Paper, Apr. 1, 2016, pp. 1-62.

Ira, Wagman, "Global formats and canadian television: The case of deal or no deal", In Canadian Journal of Communication, vol. 38, Issue 4, Oct., 2013, pp. 611-627.

Yang et al., "Analyzing the relationship between organic and sponsored search advertising: Positive, negative, or zero interdependence?", In Marketing Science, vol. 29, Issue 4, Apr. 8, 2010, pp. 1-22.

Robert B. Zajonc, "Attitudinal effects of mere exposure", In Journal of Personality and Social Psychology, vol. 9, Issue 2, Jun. 1968, pp. 1-27.

Zentner et al., "How video rental patterns change as consumers move online", In Journal of Management Science, vol. 59, Issue 11, Aug. 2, 2013, 49 pages.

\* cited by examiner

MOBILE COMPUTING DEVICE

CONTENT EVENT INSIGHTS

BACKGROUND

Various enterprises use television content to convey a message, typically in promotion of goods, services, ideas, and the like. The content may range in length from a few seconds to several minutes, and is typically played between programs or programming segments. As can be appreciated, it is desirable to measure and analyze the impact of content events upon viewers, for example, to determine an amount of interest generated for an advertised product, service, or idea responsive to the content.

When individuals are interested in a product, they oftentimes search for more information about the product on the Internet. For example, it is commonplace for individuals to use or be in reach of an Internet-connected computing device when viewing television. Accordingly, the impact of a content event on viewer interest may be reflected by searches for information about the product. However, the information related to the searches performed may be insufficient to accurately determine whether the content event had an impact.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage devices including processor executable instructions for analyzing the effects of content events on correlated search queries are provided herein. As a content event occurs, terminology and key words related to the content event are analyzed against user activities (e.g., search queries submitted to search engines, posting and search interactions on social media, posting on forums, product searches and purchases, or other type of user activity) to determine the effect of the content event on what persons exposed to the content event. The timing, devices used, user-demographics of the searches are collected to refine the analysis of the effect of the content event. For example, search queries may be gathered into fine-grained time periods, mobile/desktop device groups, and various geographic regions to determine how users are performing searches in light of the content event. The gathered search queries are refined based on the searches of persons not exposed to the content event to more accurately demonstrate the effect of the content event.

In various aspects, the functionality of a computing device using or providing a search engine is improved by providing more relevant results to search queries in response to the occurrence of a content event that is expected that a user is expected to desire, thus reducing the need to perform multiple searches to refine the user's intended search.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
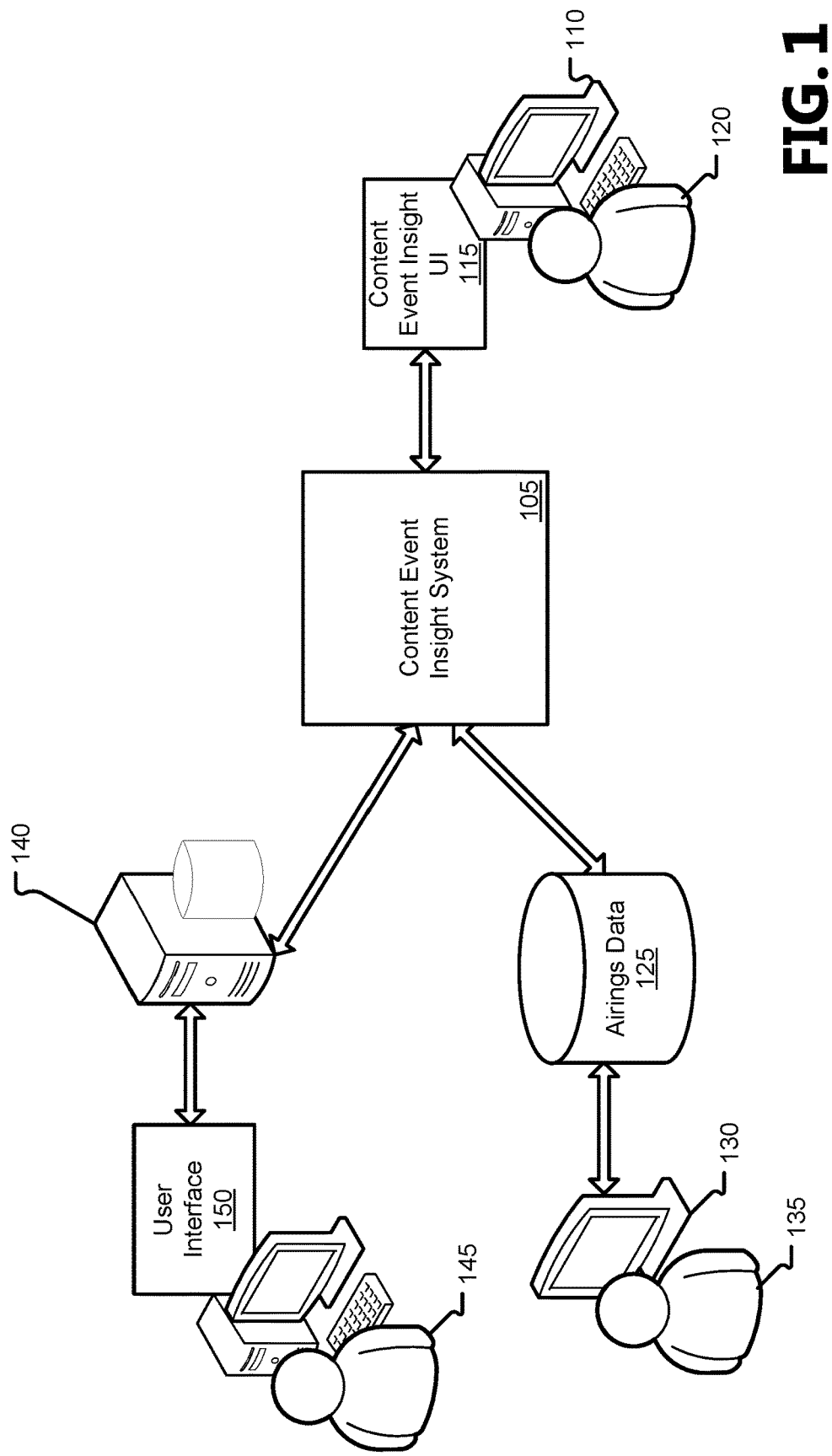
FIG. 1 is a block diagram of one example environment in communication with a content event insight system.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer readable storage devices including processor executable instructions for analyzing the effects of content events on correlated search queries are provided herein. As a content event occurs, terminology and key words related to the content event are analyzed against user activities (e.g., search queries submitted to search engines, posting and search interactions on social media, posting on forums, product searches and purchases, or other type of user activity) to determine the effect of the content event on what persons exposed to the content event. The timing, devices used, user-demographics of the searches are collected to refine the analysis of the effect of the content event. For example, search queries may be gathered into fine-grained time periods, mobile/desktop device groups, and various geographic regions to determine how users are performing searches in light of the content event. The gathered search queries are refined based on the searches of persons not exposed to the content event to more accurately demonstrate the effect of the content event.

In various aspects, the functionality of a computing device using or providing a search engine is improved by providing more relevant results to search queries in response to the occurrence of a content event that is expected that a user is expected to desire, thus reducing the need to perform multiple searches to refine the user's intended search. Further, it should be noted that online material (e.g., organic search results, promoted search results, products, etc.) may be promoted during the time period surrounding the occurrence of the content event.

The content event insight system may interact with various people and resources regarding people's interactions. As used herein, a "user" is a person using the content event insight system for determining the impact and/or effectiveness of the content event by analysis of online activity, a "searcher" is a person that is performing the online activity (e.g., performing a search) that is analyzed by the content analysis system, and a "consumer" is a person that is viewing the content event. It should be recognized that the "searcher" and the "consumer" may be the same person when the "consumer" performs an identified online activity, thereby also being a "searcher."

With reference now to FIG. 1, a block diagram of one example environment 100 in communication with a content event insight system 105 is shown. As illustrated, the example environment includes a computing device 110. The computing device 110 is one of various types of device, including, but not limited to: a desktop computer, a mobile communication device, a laptop computer, a tablet computing device, a laptop/tablet hybrid computing device, a large screen multi-touch display, a gaming device, a smart television, a wearable device, or other type of computing apparatus for utilizing a content event insight user interface 115 for obtaining content event insights. The hardware of these computing apparatuses is discussed in greater detail in regard to FIGS. 5, 6A, 6B, and 7.

A user 120 may interact with a content event insight user interface 115 on the computing device 110 to determine the effects of content events on keyword searches, which allows the user to determine the impact and/or effectiveness of the content event. The content event insight user interface 115 may be provided by thick client applications, which may be stored locally on the computing device 110, or a thin client application (i.e., web applications) that reside on a remote server and are accessible over a network, such as the Internet or an intranet. In various aspects, a thin client application is hosted in a browser-controlled environment or coded in a browser-supported language and is reliant on a web browser to render the content event insight user interface 115 executable on the computing device 110. According to an aspect, the content event insight user interface 115 is a program that is launched and manipulated by an operating system and is published on a display screen associated with the computing device 110.

With reference still to FIG. 1, the content event insight user interface 115 is in communication with a content event insight system 105. The content event insight system 105 is operative to receive information from the user 120, via the content event insight user interface 115, which relates to and identifies the content event. According to one aspect, the content event insight system 105 is configured to receive one or more keywords from the user 120. In one example, the keywords include terms associated with a specific content event. In another example, the keywords include terms associated with a specific entity. Further, according to another aspect, the content event insight system 105 is configured to receive event criteria regarding a content event. In one example, the event criteria include terms associated with the content event and a specified time period. In another example, the event criteria include a time and a location associated with the content event. In yet another example, the event criteria identifies a geographical location associated with the content event. According to another aspect, the user 120 may input cohorts for comparison, such as gender, age, computing device type, the type of search results (e.g., organic search results or sponsored search results), etc.

Further, the content event insight system 105 is in communication with airings data resource 125. The airings data resource 125 generally refers to a resource with information relating to the content events that are presented on a display device 130 (e.g., a computing device, a large screen display, a gaming device, a smart television, or a wearable device) to content consumers 135. According to one aspect, the airings data resource 125 includes historical information, present content information, and/or future content events. Further, the airings data resource 125 includes, but is not limited to, one or more of observation areas (e.g., a given postal code, city, state, province, region, country), transmission information (e.g., channel, media, etc.), timestamps associated with occurrence of the content event, spend information associated with the content event, descriptive statistics regarding the content event, other content events occurring within the timeframe, and the overall distribution of content events. According to one aspect, the content event insight system 105 is configured to retrieve various portions of information from the airings data resource 125 based on the information received from the user 120. In one example, the content event insight system 105 retrieves event information regarding the content event. In another example, the content event insight system 105 retrieves other content events occurring within the specified time period defined in the event criteria.

Additionally, the content event insight system 105 is in communication with data resource 140. The data resource 140 refers to a resource with information relating to an online activity. Generally, the data resource 140 includes information about online activities that relate to the content event. In one example, the data resource 140 includes information relating to posting and search interactions via social media. In another example, the data resource 140 includes information relating to product searches and purchases from an online retailer. In the illustrated example, the data resource 140 includes information relating to the search queries that searchers 145 submit to a search entity (e.g., GOOGLE®, BING®, YAHOO!®, etc., available from Google Inc., of Mountain View, Calif.; Microsoft Corp. of Redmond, Wash.; and Yahoo Inc. of Sunnyvale, Calif. respectively) via a user interface 150. According to one aspect, the data resource 140 includes historical information. Further the data resource 140 includes, but is not limited to, one or more of search queries, associated timestamps, search results (e.g., links and descriptions), computing device types, various demographic information (e.g., information from profile information, etc.), and operating system. According to one aspect, the content event insight system 105 is configured to retrieve various portions of information from the data resource 140 based on the information received from the user 120. In one example, the content event insight system 105 retrieves search logs relating to a particular keyword for a designated timeframe. In another example, the content event insight system 105 retrieves search logs relating to a particular keyword for a designated timeframe that is consistent with the specified cohorts.

The content event insight system 105 is configured to analyze the information from the airings data resource 125 and the data resource 140 to provide reports for the user 120. In one example, the content event insight system 105 is configured to generate statistics or other quantitative measures to provide insights into whether the content event is effective. In another example, the content event insight system 105 is configured to generate a comparative report that provides a comparison of the relevant search queries based on demographic information. Additionally, the comparative report may compare the content event with other content events in the specified time period. Thus, the user 120 is able to determine whether the content event had a correlation with search queries.

According to one aspect, the content event insight system 105 utilizes a predictive model to analyze and generate results. It should be recognized that the content event insight system 105 may include other forms of artificial intelligence or machine learning.

In one example, the predictive model may be configured to provide information relating to the correlation of content events and search queries. Further, it should be recognized that the predictive model is built and trained based on a training model that defines the insights based on the observed patterns, including information relating to observation areas, transmission information, occurrences of the content event, search queries, search results, computing device types, various demographic information, as well as other information from the airings data resource 125 and the data resource 140. The training model refines the content event insight model using a machine learning approach that verifies its accuracy using the collected information as a training set to verify the accuracy of the content event insight models.

During a learning phase, the models are developed against a training dataset of known inputs (e.g., sample A, sample B, sample C) to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs, in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs in how consistently it places a given input into a given group and how reliably it produces the n desired clusters across each epoch.

Once an epoch is run, the models are evaluated and the values of their variables are adjusted to attempt to better refine the model. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, etc.

The model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. Models that are finalized are evaluated against testing criteria. In a first example, a testing dataset that includes known outputs for its inputs is fed into the finalized models to determine an accuracy of the model in handling data that has not been trained on. In a second example, a false positive rate and false negative rate may be used to evaluate the models after finalization. In a third example, a delineation between clusterings is used to select a model that produces the clearest bounds for its clusters of data.

Figure 2A:
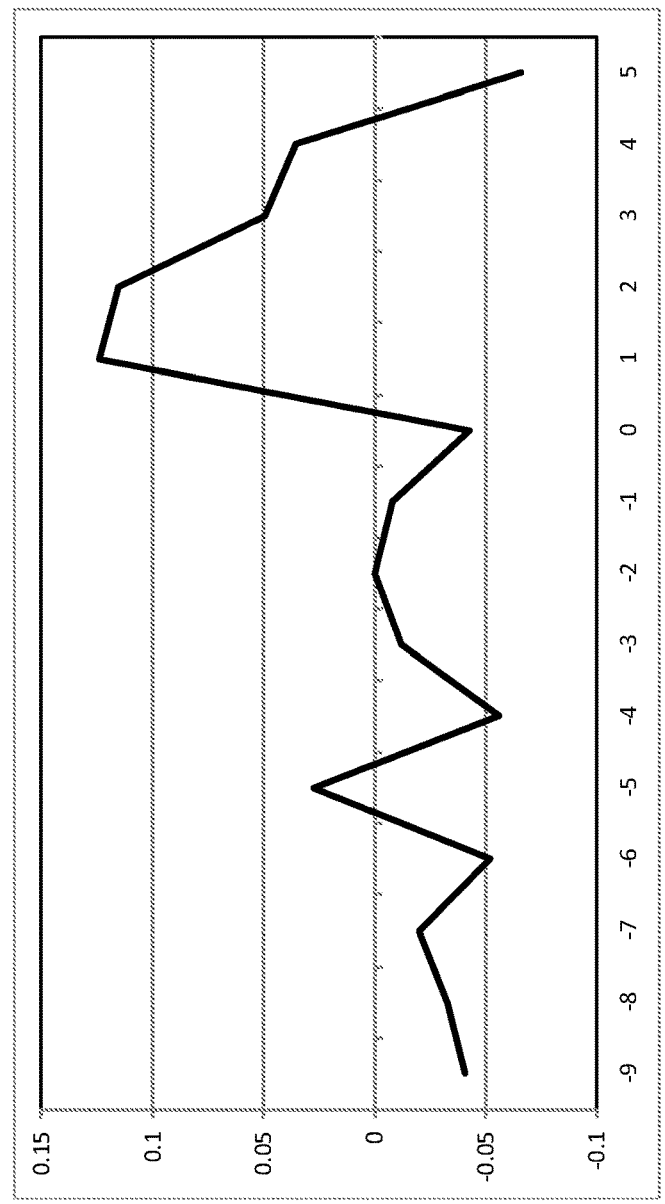
FIGS. 2A-2C illustrate example content event graphs detailing information regarding a search query.
Figure 2B:
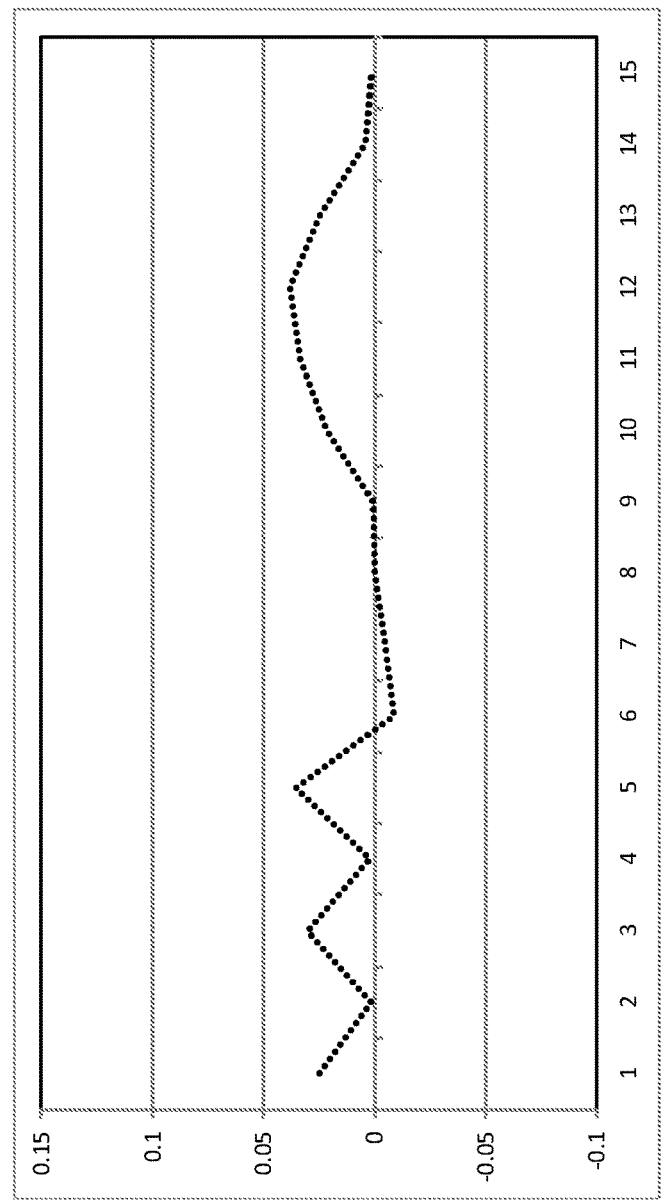
Figure 2C:

FIGS. 2A-2C illustrate example content event graphs 200. Each of the example content event graphs 200 illustrate a time series of variances in search frequency from a reference search time for a given keyword. In each example content event graph 200, the reference search time is set as two minutes prior to the content event's occurrence to allow for variances in the reported time of the content event, although other reference search times may be chosen in other aspects.

FIG. 2A illustrates an example content event graph 200 detailing raw data of search frequency variances over a period of time nine minutes before and five minutes after a content event occurring. As can be seen, there is natural variance in the frequency of observed searches compared to the reference search time, with a noticeable uptick in the frequency of searches for the keyword at the one and two minute marks after the content event.

FIG. 2B illustrates an example content event graph 200 detailing data constrained by prior observed search frequencies. For example, for an observation area (e.g., a given postal code, city, state, province, region, country) a given search term may be more frequently used as a matter of course than in another area, which may affect how the content event should be evaluated as influencing the frequency of the keyword being searched. To illustrate, consider a city with a popular sports team with a name similar to a keyword of interest for which the residents frequently submit queries to buy tickets, research scores, etc., according to the name of that team. The effects of the content event on the search frequency may therefore be too small relative to the background search patterns for the city to identify without controlling for the background search patterns. In various aspects, search results from a prior time period (e.g., last week, yesterday, a hour ago) are used to determine a background frequency, which is applied to the current time period to control for the background frequency and produce a more effective determination of the effect of the content event (such as in FIG. 2A). In other aspects, an A/B test is used to control for the background frequency, such as, for example, the search results from a second city receiving the content event, but lacking the sports team with a similar name to the keyword of interest.

FIG. 2C illustrates an example content event graph 200 detailing data for two different geographic subdivisions. The geographic subdivisions may be mutually exclusive (e.g., city A and city B, state A and city B in state C) or inclusive (e.g., nation A and state B within nation A) in various aspects. Additionally, the effect of the content event on search frequencies for the keyword may be measured between the two geographic regions, such as for example, for AB testing or viewing a localized effect of a content event.

Figure 3:
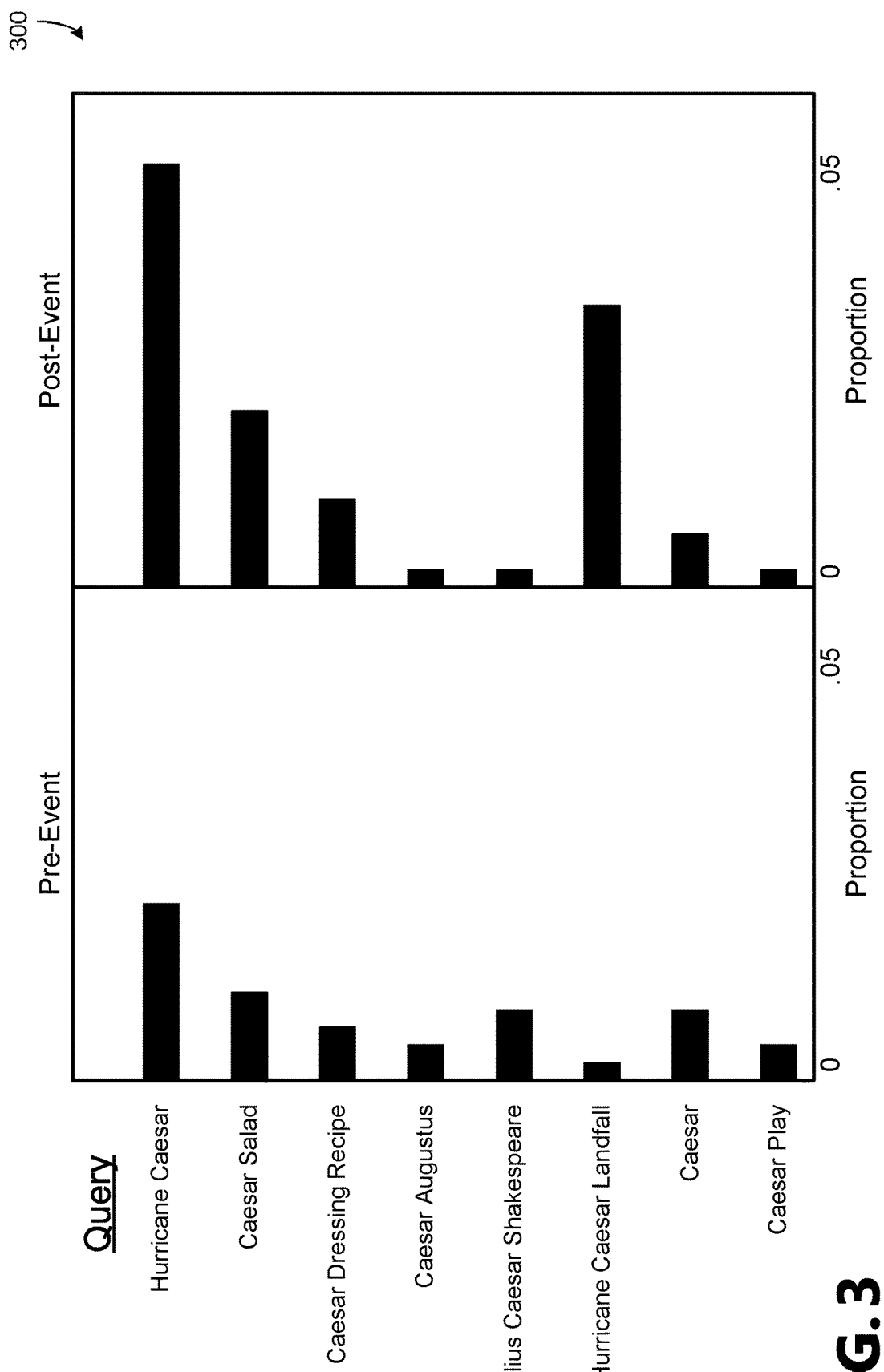
FIG. 3 illustrates an example bar graph showing the relative proportions for several query strings.

FIG. 3 illustrates an example bar graph 300 showing the relative proportions for several query strings related to the keyword "Caesar", both before and after a content event, such as for example, a weather alert for a hurricane named "Caesar". As will be appreciated, search queries often include several words to address a user's query, which may be in response to a content event or unrelated. The combinations of these words are observed, and changes to the relative proportions of those combinations are presented in pre- and post-event periods, such as, for example the m minutes before and the m minutes after a content event occurs. The relative proportions of each search string are shown in the example bar graph 300, which demonstrate a change in the relative frequencies of searches of "Hurricane Caesar" and "Hurricane Caesar Landfall", which indicate that the content event of the weather alert may have had a statistically significant effect on searches related to the hurricane. Other effects of the content event may also be determined, such as, for example, moderate increases in searches for "Caesar Salad" and "Caesar Dressing Recipe" and moderate decreases in searches for "Julius Caesar Shakespeare". Thus, is should be recognized that the content event insight system 105 allows users to specify groups of keywords of interest. The more specific the keyword (e.g., a product code) the more likely the effect of the content event may be determined. However, the more specific the keyword, the less frequent the searches will be overall.

In various aspects, articles, conjunctions, and known "helping phrases" may be removed from the query strings to more accurately group queries with similar intents. For example, the search queries for "The Caesar Play", "Caesar AND play", and "Who wrote the Caesar play?" may be grouped together as "Caesar play". In various aspects, various helping phrases are defined (of which "who wrote" is one non-limiting example) that remove natural language usage from the query strings to better group the intents of the queries. Additionally, word order in the search query may be ignored. For example, query strings of "Salad Caesar" and "Caesar Salad" may be grouped together to determine a shared proportion.

Figure 4:
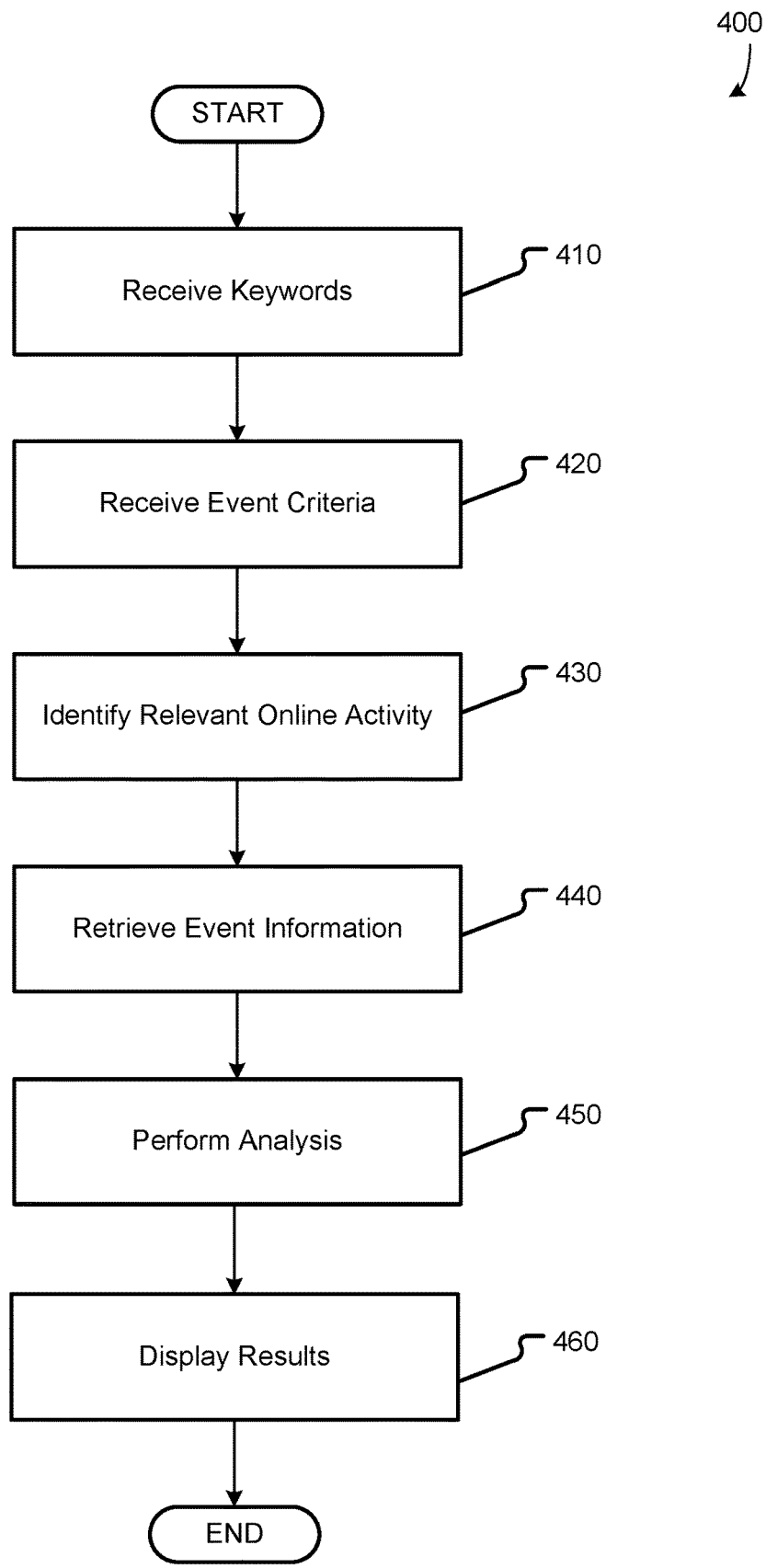
FIG. 4 is a flowchart showing general stages involved in an example method for providing content event insights.

FIG. 4 is a flowchart showing general stages involved in an example method 400 for providing content event insights. Method 400 begins at OPERATION 410 where the computing device receives one or more keywords from the user. In one example, the one or more keywords include terms associated with a specific content event. In another example, the one or more keywords associated with a specific entity.

At OPERATION 420, the computing device receives event criteria regarding a content event within a specified time period. In one example, the event criteria include a time and a location associated with the content event. In another example, the event criteria identify a geographical location associated with the content event. In yet another example, the event criteria identify cohorts (e.g., gender, age, computing device type, etc.) associated with the content event.

At OPERATION 430, the computing device identifies relevant online activity. In one example, the computing device identifies relevant search queries relating to the one or more keywords. According to one aspect, the content event insight system 105 queries a data resource 140 that includes previously submitted search queries. In one example, the computing device queries a data resource 140 based on the one or more keywords and event criteria for search query results. As noted above, the query may include demographic criteria that influences relevancy of the search results. The results from querying the data resource 140 may vary depending on the keywords and event criteria, but may include one or more of: search queries with associated timestamps, responsive search results, computing device types, demographic information, and operating system. Further, the data resource 140 may provide information regarding search volume, click-through rates, and information regarding the sponsored links that are provided in the search results. Further, it should be recognized that the data resource 140 provides detailed information regarding the occurrences, frequency, and times associated with a search query. Accordingly, the variance in the frequency of observed searches may be compared to the occurrences of the content event.

At OPERATION 440, the computing device retrieves event information regarding the content event. More specifically, the content event insight system 105 queries an airings data resource 125 that includes information relating to the specifics of occurrences of the content events. In one example, the airings data resource 125 includes information regarding one or more of observation areas, transmission information, timestamps associated with occurrence of the content event, spend information associated with the content event, descriptive statistics regarding the content event and other content events occurring within the timeframe. Depending on the event criteria, the content event insight system 105 may retrieve different types of information from the airings data resource 125.

At OPERATION 450, the computing device performs analysis of the relevant search queries and the information regarding the content event. According to one aspect, the content event insight system 105 is configured to generate a comparative report regarding the content event and other content events in the specified time period. According to another aspect, the content event insight system 105 is configured to generate a comparative report including a comparison of demographic information associated with the search queries concerning the content event. In another aspect, the content event insight system 105 may generate a comparative report that isolates whether a content event had an impact on search queries by consideration of content events that occurred via simultaneous substitution in a different geographical location. Simultaneous substitution refers to the practice of providing programming in two distinct locations where a first location displays a first content event associated with the programming and the second location substitutes a second content event for the first content event. By considering one of the locations as a baseline for online activity of comparison, the content event insight system 105 establishes a "control" group with similar viewing habits that were not exposed to the other content event. Thus, based on a comparison of the relevant search queries and the information regarding the content event within the geographical location associated with the content event with relevant search queries and the information regarding the content event outside of the geographical location associated with the content event, the content event insight system 105 is able to determine the content event's correlation with search queries. In another aspect, the content event insight system 105 may generate a comparative report that isolates whether a content event had an impact on online activity by consideration of content event that occurred at a previous time to content event that occurred at the present time (e.g., online activity associated with a content event that occurred 1 week prior is compared to online activity associated with the current content event).

In accordance with one aspect, the content event insight system 105 analyzes the search volume associated with search results. More particularly, example FORMULA 1 provides a regression specification that relates to the value of search queries initiated in a given minute, from a content event exposed geography, to the recency of the content event (e.g., minutes since occurrence of the content event). The estimation strategy identifies content event related variation in online activity (e.g., search activity) in the minutes surrounding the content event, separating it from variation due to other causes (e.g., natural cyclical patterns). This is achieved by simultaneously contrasting online activity (e.g., search volumes) in the exposed geography (following the content event) with online activity (e.g., search volume) in the same geographic prior to the content event, as well as with online activity (e.g., search volumes) in a neighboring (non-exposed) geography. FORMULA 1 provides:

$$\log(SearchVolume_{ijt}) = $$
$$\alpha \cdot USA_i + \beta \cdot \sum_{\rho=-16}^{+15} RelMinute_{jt}^{\rho} + \gamma \cdot \sum_{\rho=-16}^{+15} RelMinute_{jt}^{\rho} \cdot USA_i + $$
$$\delta \cdot USA_i \cdot \log(Aspend_j) + \lambda \cdot \sum_{\rho=-16}^{+15} RelMinute_{jt}^{\rho} \cdot \log(AdSpend_j) + $$
$$\eta \cdot \sum_{\rho=-16}^{+15} RelMinute_{jt}^{\rho} \cdot USA_i \cdot \log(AdSpend_j) + \mu_j + \varepsilon_{ijt}$$

In FORMULA 1, Y is the volume of search queries in country i at minute t for ad-run j. Further, a vector of ad-run fixed effects, μ, is utilized to absorb all the static characteristics of a panel, including the effects of content events, country, content provided at times surrounding the content event, and the entity/item. Further, RelMin is based on the duration of the content event. In one example, RelMin for t0 equals 1 during the time that the content event occurs and 0 otherwise. Likewise, RelMin and t1 equals 1 only for observations that took place in the minute immediately following the content event, and 0 otherwise. In determining the search volume, the coefficients of interest are those reflected by η, which captures the difference-in-difference estimates of search volumes. Based on the calculations, the content event insight system 105 may observe the differences in search queries between geographical locations where convent events differ. Thus, the content event insight system 105 observes a first difference between search volumes in the geographical locations prior to the content event and significant differences between search volumes in the geographical locations after the content event.

In accordance with another aspect, the content event insight system 105 analyzes sponsored search results and click-through rates associated with search query. More particularly, example FORMULA 2 discloses:

$$\log(SearchClicks_{ijt}) = $$
$$\alpha \cdot USA_i + \beta \cdot \sum_{\rho=-16}^{+15} RelMinute_{jt}^{\rho} + \gamma \cdot \sum_{\rho=-16}^{+15} RelMinute_{jt}^{\rho} \cdot USA_i + $$
$$\delta \cdot USA_i \cdot \log(Aspend_j) + \lambda \cdot \sum_{\rho=-16}^{+15} RelMinute_{jt}^{\rho} \cdot \log(AdSpend_j) + $$
$$\eta \cdot \sum_{\rho=-16}^{+15} RelMinute_{jt}^{\rho} \cdot USA_i \cdot \log(AdSpend_j) + $$
$$\phi \cdot SearchVolume_{ijt} + \mu_j + \varepsilon_{ijt}$$

In FORMULA 2, the volume of sponsored search results and click-throughs is observed. The results of FORMULA 2 may provide an indication that sponsored search listings may become more preferential in the moments following a content event. Further, consideration of demographic segments of the population may also be considered in the calculations, which may provide an indication that a particular demographic group was particularly motivated to investigate the content event. Thus, an entity may be able to determine whether the content event was effective on a targeted demographic group based on differences between demographic groups' searches and sponsored links.

In accordance with yet another aspect, the content event insight system 105 analyzes click-through rates associated with search results. More particularly, example FORMULA 3 provides an indicator of whether the link was clicked by the user. FORMULA 3 discloses:

$$AdClick_{ij} = \alpha \cdot 2nd_j + \beta \cdot USA_i \cdot 2nd_j + \gamma \cdot \sum_{\rho=-16}^{+15} RelMinute_{jt}^{\rho} \cdot 2nd_j + $$
$$\eta \cdot \sum_{\rho=-16}^{+15} RelMinute_{jt}^{\rho} \cdot USA_i \cdot 2nd_j + \delta \cdot URL_{ij} + \mu_j + \varepsilon_{ijt}$$

In FORMULA 3, a set of queries that were initiated on a search engine, using a set of keywords is observed for each sponsored search result, j, that was displayed as a result of a search query, i. Like in FORMULA 1, FORMULA 3 incorporates RelMinute that represents a series of independent variables associated with the content event. For example, RelMinute may be represented by a vector for each minute in the post period (e.g., t0, t+1, t+3 ... and t−1, t−2, t−3, etc.). In one example, RelMinute⁰ equals 1 when content event begins. These values may incorporate dummy values or other values associated with the content event. Additionally, a query-level fixed effects, μ, is utilized to account for any static features of the search query (e.g., keyword choice, device type, or searcher intent, etc.). The query-level fixed effect subsumes the effects of the RelMin and USA variables and any absolute query timing. Furthermore, in FORMULA 1, the 2nd variable that equals 1 when the query result being observed is in the second position in search results instead of the first position. Further, if the interaction term between $RelMin^{t+1}$ and the 2nd variable were negative and statistically significant, for example, this would indicate that the relative likelihood of the second link in the search results being clicked, compared to the first link, declines significantly beyond the baseline situation. In the above example, the significant negative interaction would indicate that the preference of the top link result over the second link result becomes significantly stronger for queries run in the minute immediately following a content event. Thus, a negative interaction provides insights that in the minutes following a content event, the importance of sponsored search listings are of greater importance for an entity.

At OPERATION 460, the computing device displays results of the analysis that identify any correlation of the search queries associated with the content event.

Based on the above method, it is possible for a user to measure the effectiveness of content events based on whether a content event prompts or effects user online activity (e.g., users search for more information about the item). Further, because a user is able to determine that people are likely to respond to content events within three minutes after the content event occurred, content event organizers can take advantage of the response by tailoring the content item of the content event (e.g., position in the search results) to anticipate online activity associated with the content event. In other words, Organizers of content events can coordinate content events with online activities (e.g., sponsored search results) in the minutes after the content event to lead people to the relevant information.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
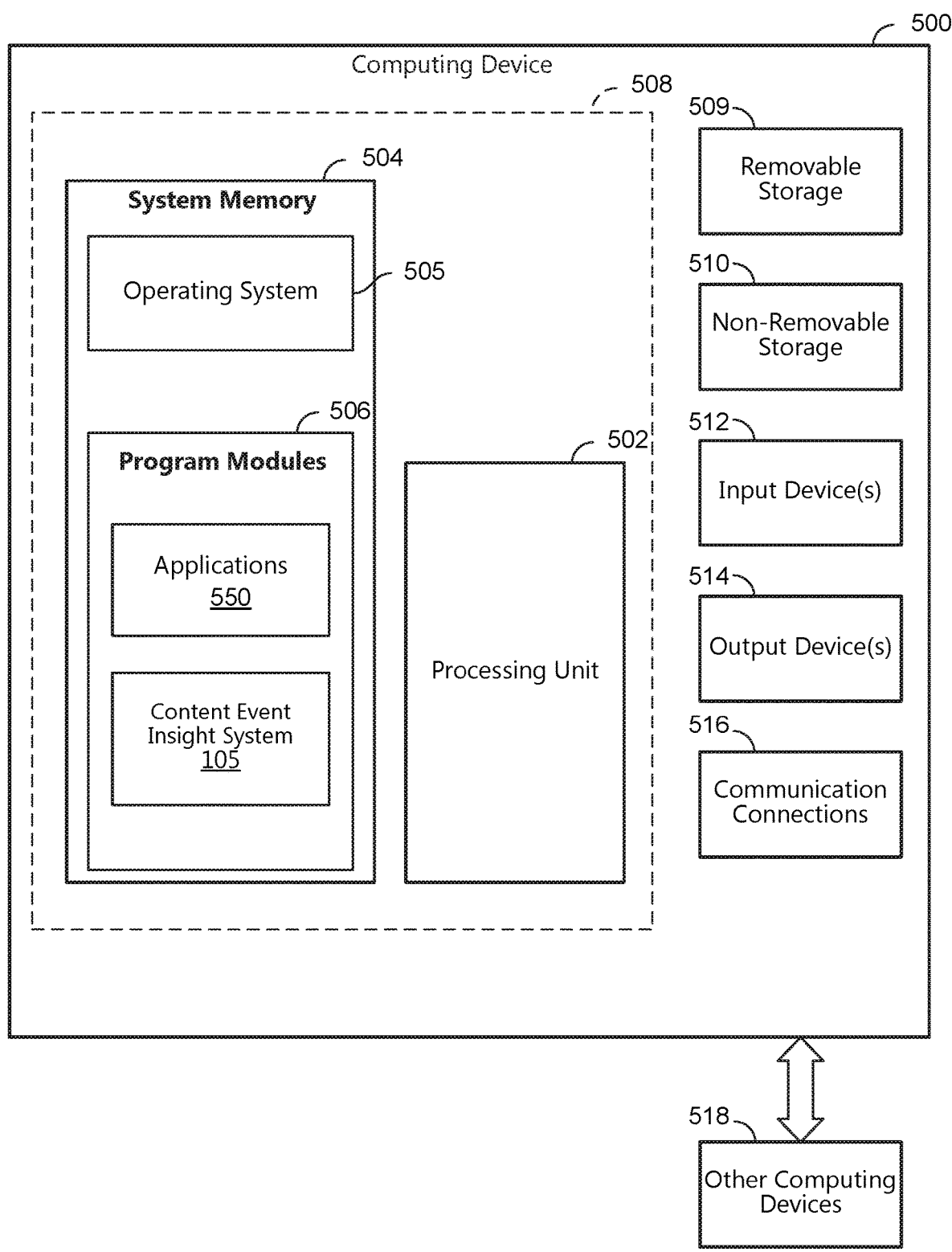
FIG. 5 is a block diagram illustrating example physical components of a computing device.
Figure 6A:
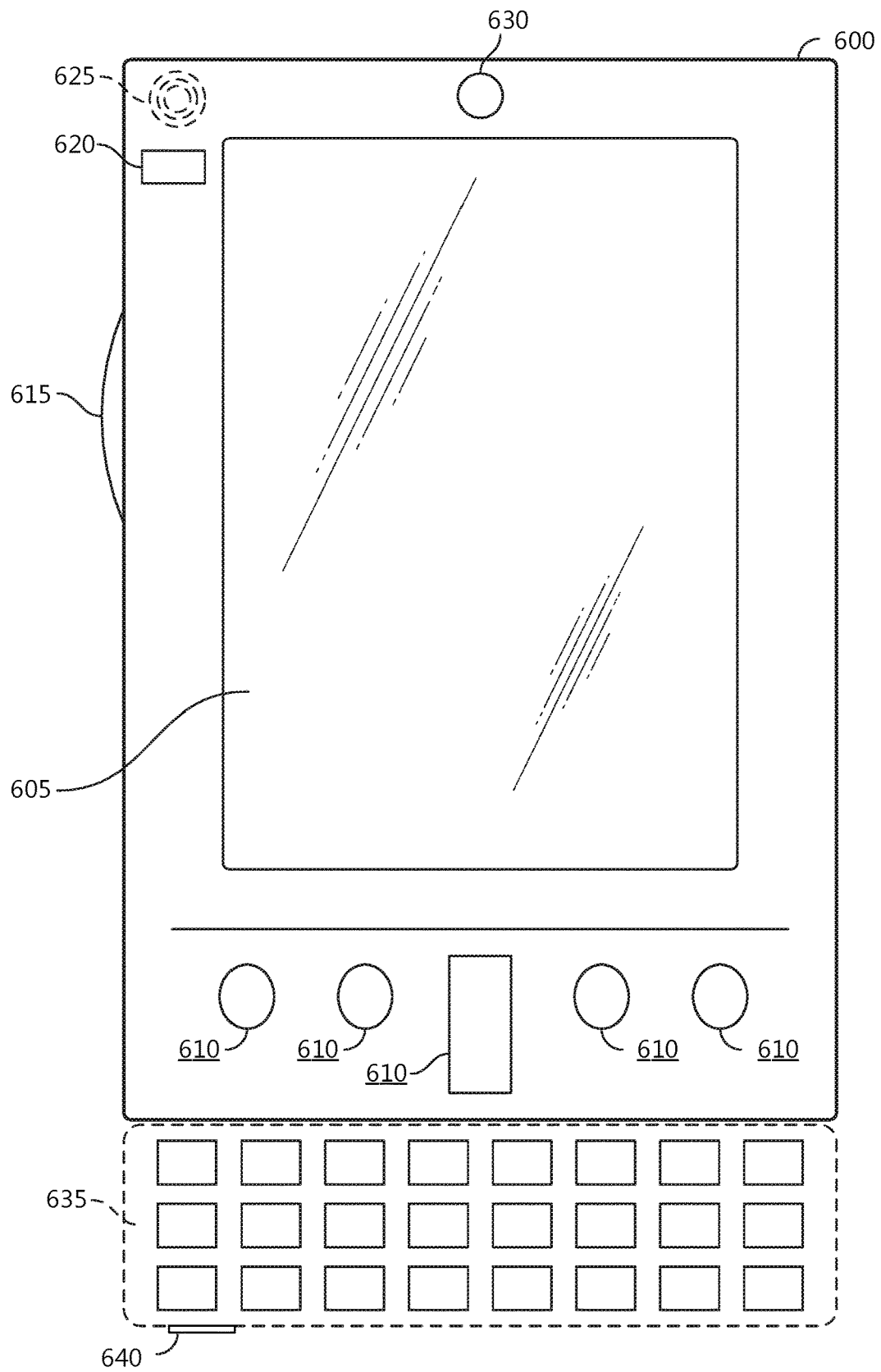
FIGS. 6A and 6B are block diagrams of a mobile computing device.
Figure 6B:
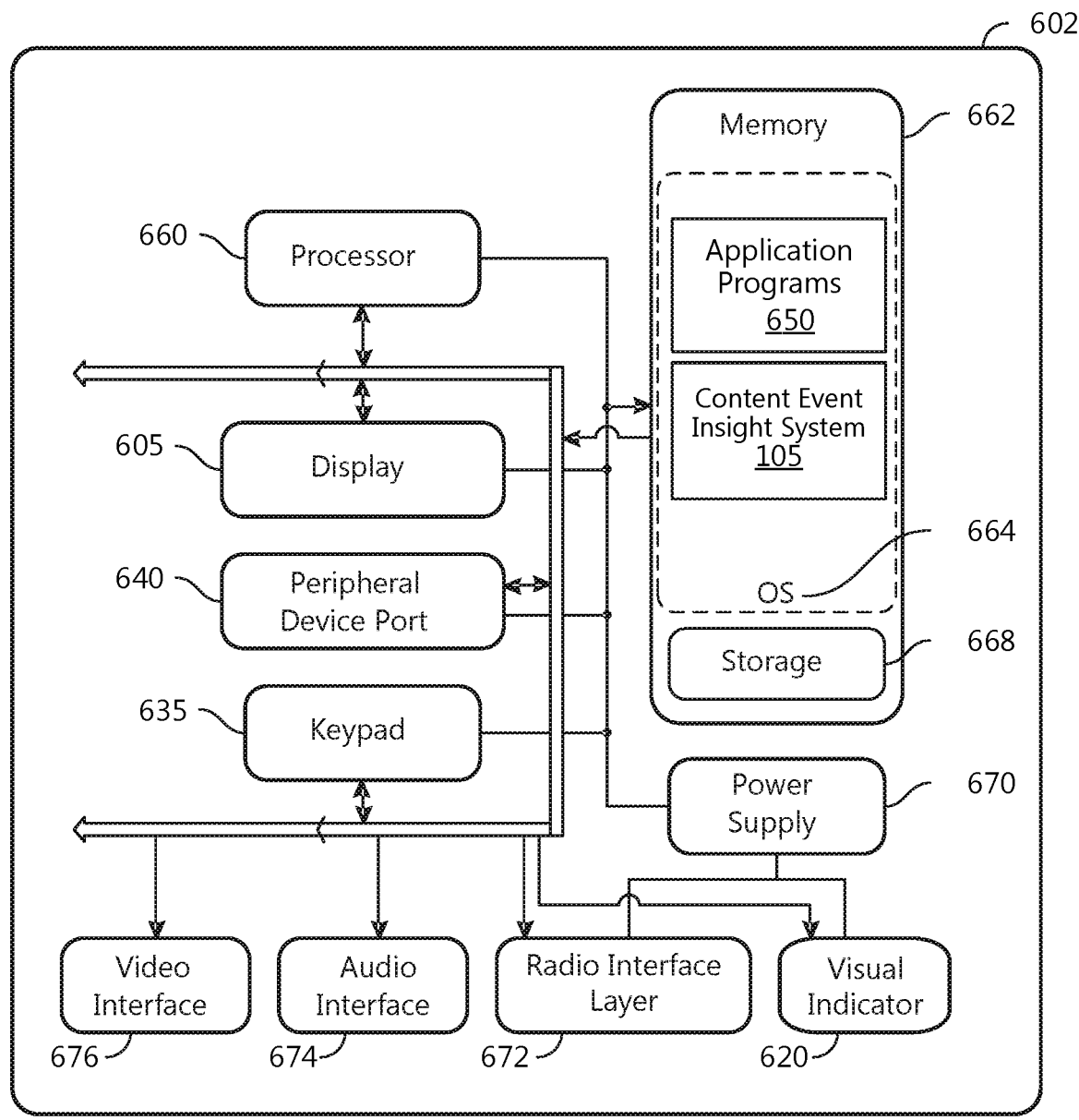
Figure 7:
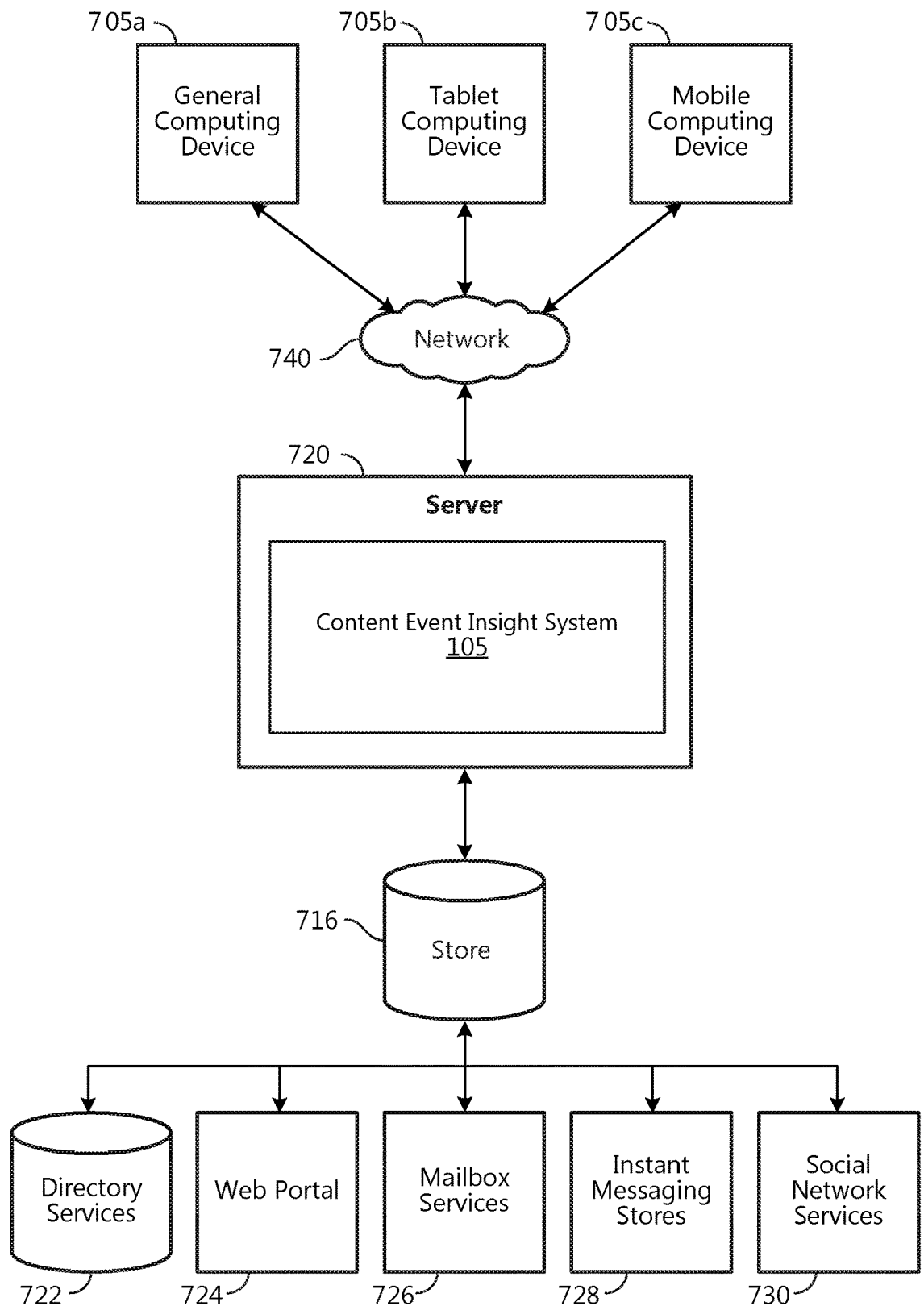
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes content event insight system 105. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., content event insight system 105) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, content event insight system 105 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries.

According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for providing insights into reception of a content event as described above. Content developed, interacted with, or edited in association with the content event insight system 105 is enabled to be stored in different communication channels or other storage types. For example, various documents may be stored using a directory service 722, a web portal 724, a mailbox service 726, an instant messaging store 728, or a social networking site 730. The content event insight system 105 is operative to use any of these types of systems or the like for insights into reception of a content event, as described herein. According to an aspect, a server 720 provides the content event insight system 105 to clients 705a,b,c. As one example, the server 720 is a web server providing the content event insight system 105 over the web. The server 720 provides the content event insight system 105 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing content event insights based on correlation of search queries, comprising:
   receiving one or more keywords associated with a content event;
   receiving event criteria regarding the content event that includes a specified time period associated with the content event;
   identifying relevant search queries that include the one or more keywords and were performed by searchers within the specified time period associated with the content event, the searchers including a first portion of searchers located within a geographical location where the content event was exposed and a second portion of searchers located outside of the geographical location where the content event was not exposed;
   retrieving event information regarding the content event;
   performing an analysis of the relevant search queries and the event information;
   refining results of the analysis based on the relevant search queries that were performed by the second portion of searchers located outside of the geographical location where the content event was not exposed; and
   displaying the refined results of the analysis identifying any correlation of the relevant search queries with the content event.

2. The method of claim 1, further comprising identifying other content events occurring within the specified time period defined in the event criteria.

3. The method of claim 2, further comprising generating a comparative report regarding the content event and other content events in the specified time period.

4. The method of claim 3, wherein the comparative report provides a comparison of the relevant search queries based on demographic information.

5. The method of claim 1, wherein the one or more keywords include keywords associated with a specific entity related to the content event.

6. The method of claim 1, wherein the event criteria further includes a time and a location associated with the content event.

7. The method of claim 1, wherein the event criteria further includes the geographical location where the content event was exposed.

8. The method of claim 7, wherein refining the results of the analysis based on the relevant search queries that were performed by the second portion of searchers located outside of the geographical location where the content event was not exposed comprises performing a comparison of the relevant search queries that were performed by the first portion of searchers to the relevant search queries that were performed by the second portion of searchers.

9. The method of claim 1, wherein performing the analysis of the relevant search queries and the event information includes a comparison of demographic information associated with the relevant search queries.

10. The method of claim 1, wherein identifying the relevant search queries that include the one or more keywords and were performed by the searchers within the specified time period associated with the content event, further comprises:
   querying a search database based on the one or more keywords and the event criteria; and
   receiving query results from the search database.

11. The method of claim 10, wherein identifying the relevant search queries that include the one or more keywords and were performed by the searchers within the specified time period associated with the content event, further comprises:
   retrieving historical data regarding query results associated with the one or more keywords.

12. The method of claim 10, wherein querying the search database based on the one or more keywords and event criteria, further comprises querying the search database based on demographic criteria.

13. A system for providing content event insights based on correlation of search queries, comprising:
   a processor; and
   a memory including instructions, that when executed by the processor is operable to:
      receive one or more keywords associated with a content event;
      receive event criteria regarding the content event that includes a specified time period and a geographical location associated with the content event;
      identify relevant search queries that include the one or more keywords and were performed by searchers within the specified time period associated with the content event, the searchers including a first portion of searchers located within the geographical location where the content event was exposed and a second portion of searchers located outside of the geographical location where the content event was not exposed;
      retrieve event information regarding the content event;
      perform an analysis of the relevant search queries and the event information;
      refine results of the analysis based on the relevant search queries that were performed by the second portion of searchers located outside of the geographical location where the content event was not exposed; and
      display the refined results of the analysis identifying any correlation of the relevant search queries with the content event.

14. The system of claim 13, wherein the processor is further operable to identify other content events occurring within the specified time period defined in the event criteria.

15. The system of claim 14, wherein the processor is further operable to generate a comparative report regarding the content event and the other content events in the specified time period.

16. The system of claim 15, wherein the comparative report provides a comparison of the relevant search queries based on demographic information.

17. The system of claim 13, wherein the refinement of the results of the analysis based on the relevant search queries that were performed by the second portion of searchers located outside of the geographical location where the content event was not exposed includes a comparison of the relevant search queries that were performed by the first portion of searchers to the relevant search queries that were performed by the second portion of searchers.

18. The system of claim 13, wherein the analysis of the relevant search queries and the event information includes a comparison of demographic information associated with the search queries.

19. Computer storage media including processor executable instructions for providing content event insights based on correlation of search queries, comprising:
   receiving one or more keywords associated with a content event;
   receiving event criteria regarding the content event that includes a specified time period and a geographical location associated with the content event;
   identifying relevant search queries that include the one or more keywords and were performed by searchers within the specified time period associated with the content event, the searchers including a first portion of searchers located within the geographical location where the content event was exposed and a second portion of searchers located outside of the geographical location where the content event was not exposed, the relevant search queries identified by:
      querying a search database based on the one or more keywords and the event criteria; and
      receiving query results from the search database;
   retrieving event information regarding the content event;
   performing an analysis of the relevant search queries and the event information regarding the content event;
   refining results of the analysis based on the relevant search queries that were performed by the second portion of searchers located outside of the geographical location where the content event was not exposed; and
   displaying the refined results of the analysis identifying any correlation of the relevant search queries with the content event.

* * * * *